G. R. KNICK.
RECORD TURNER FOR PHONOGRAPHS.
APPLICATION FILED FEB. 7, 1922.
1,422,989.
Patented July 18, 1922.
5 SHEETS—SHEET 2.
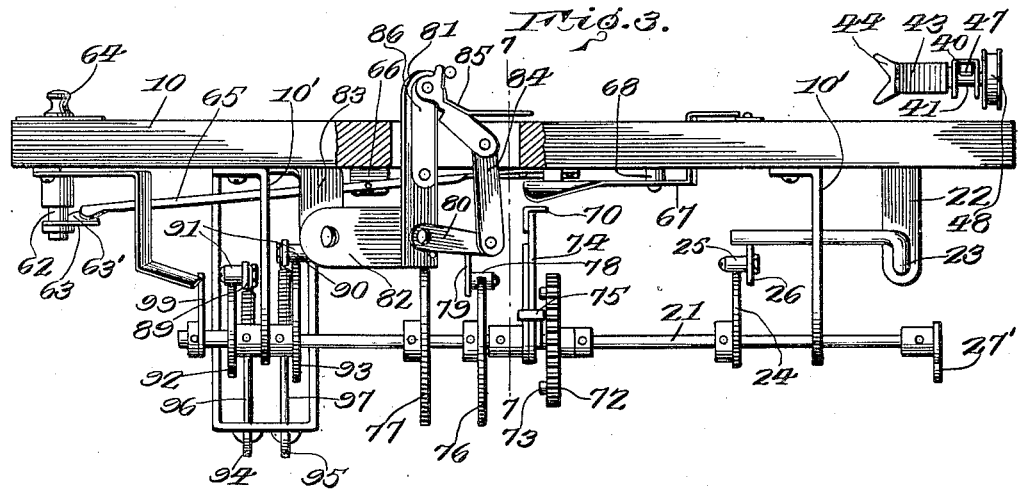
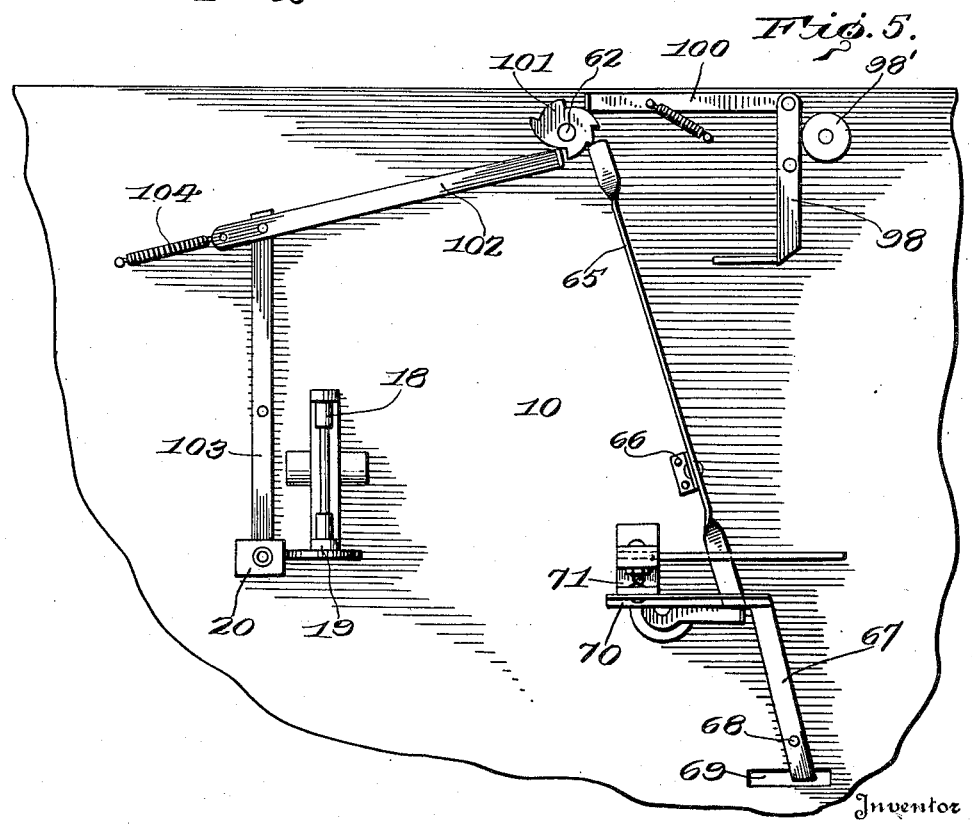
Inventor
Glenn R. Knick

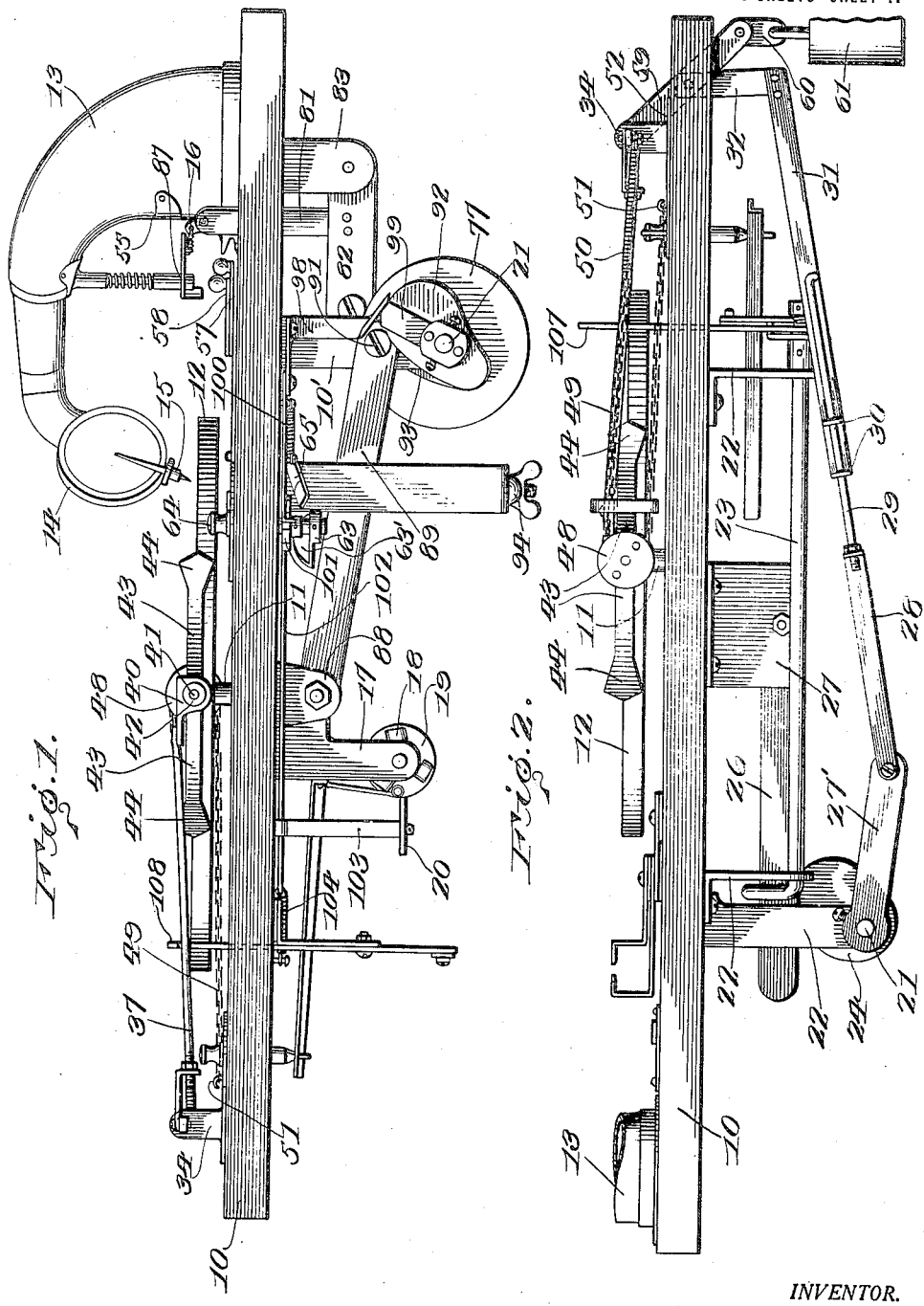

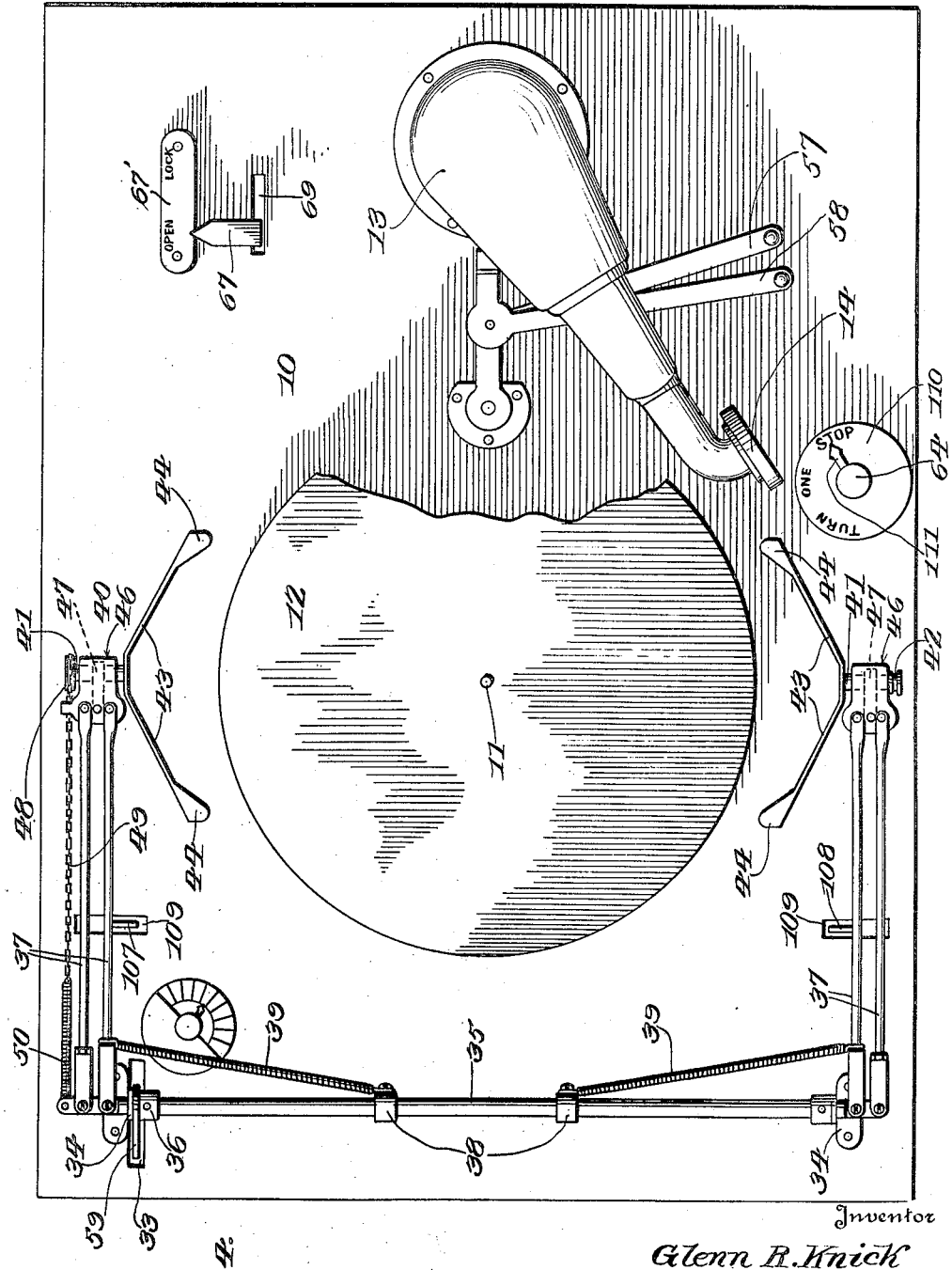

G. R. KNICK.
RECORD TURNER FOR PHONOGRAPHS.
APPLICATION FILED FEB. 7, 1922.
1,422,989.
Patented July 18, 1922.
5 SHEETS—SHEET 4.
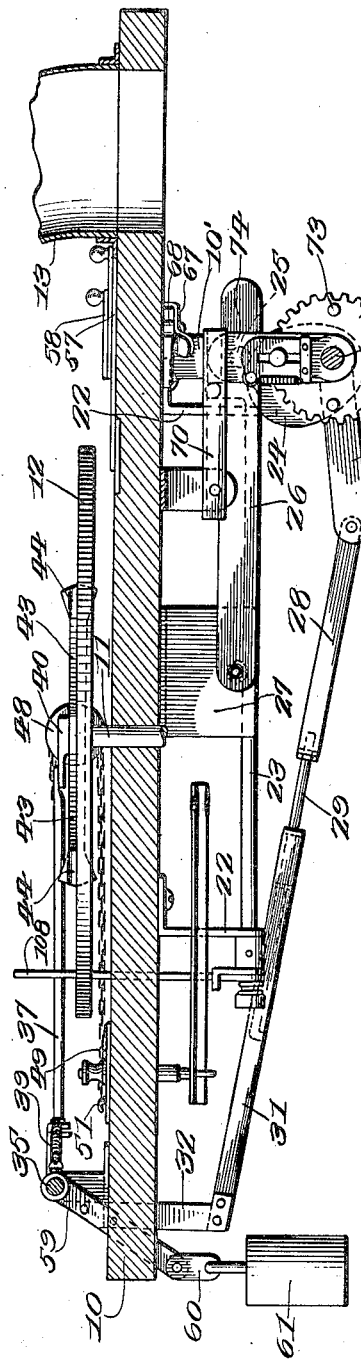
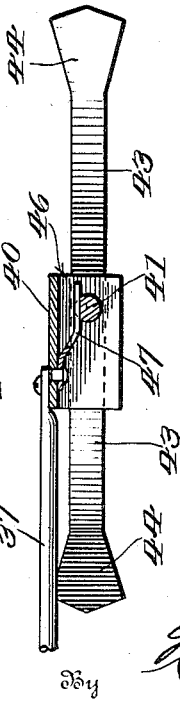
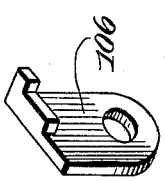
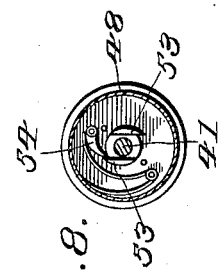
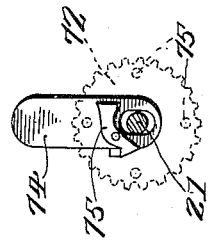
Inventor
Glenn R. Knick
By
Attorney

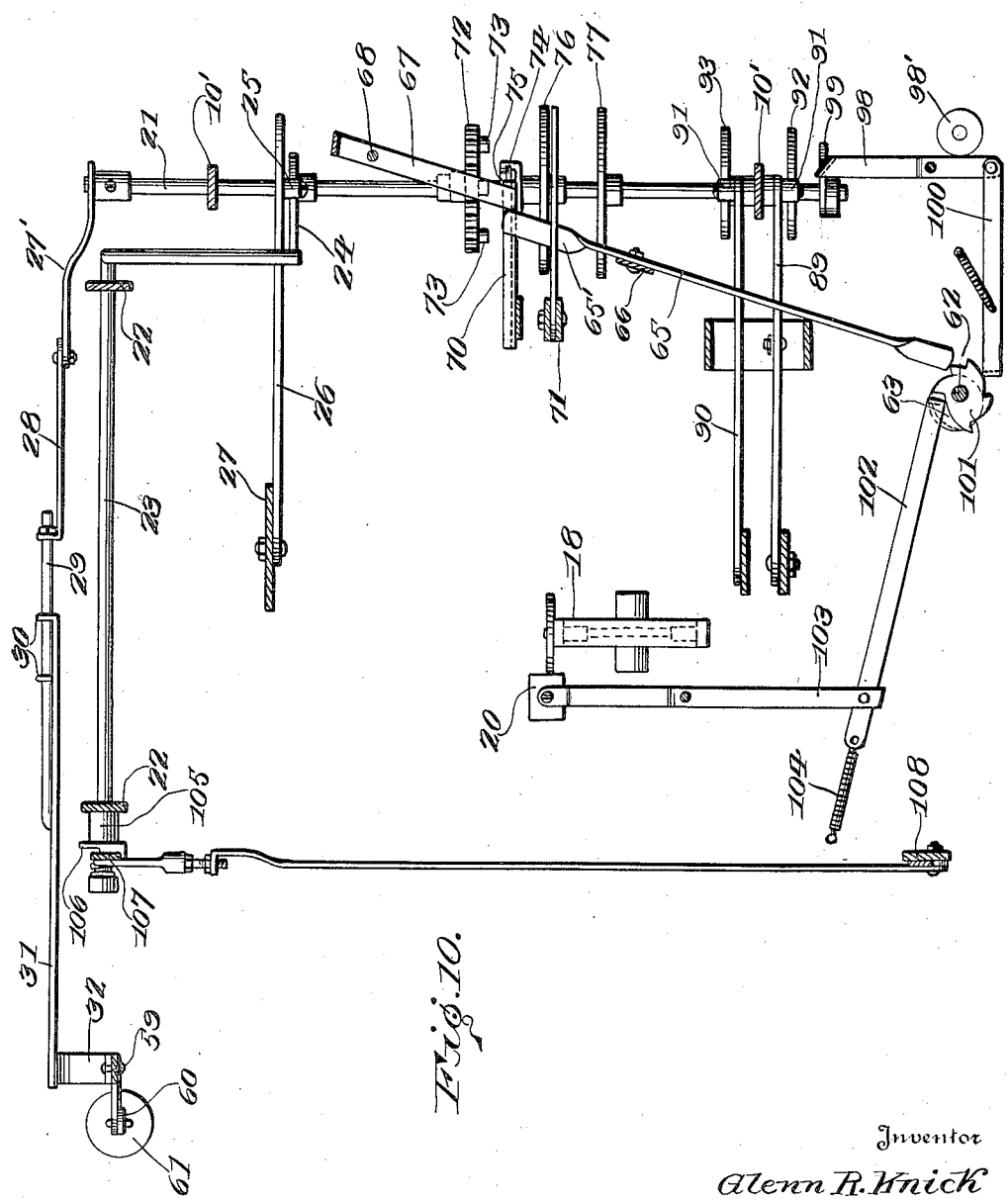

UNITED STATES PATENT OFFICE.

GLENN R. KNICK, OF TROY, OHIO.

RECORD TURNER FOR PHONOGRAPHS.

1,422,989.  Specification of Letters Patent.  Patented July 18, 1922.

Application filed February 7, 1922. Serial No. 534,747.

*To all whom it may concern:*

Be it known that I, GLENN R. KNICK, a citizen of the United States, residing at Troy, in the county of Miami, State of Ohio, have invented certain new and useful Improvements in Record Turners for Phonographs; and I do hereby declare the following to be a full, clear, and exact description of the invention, such as will enable others skilled in the art to which it appertains to make and use the same.

This invention relates to new and useful improvements in phonographs and particularly to mechanisms for manipulating the records thereof.

One object of the invention is to provide a mechanism by means of which a record will be lifted from the turntable, turned over, and replaced on the turntable.

Another object is to provide a mechanism whereby the sound-box and tone-arm will be lifted from the record, when the inner groove has been reached, the record lifted and turned over, the record replaced on the turntable, and the sound-box and tone-arm moved into position for playing the other side of the record.

A further object resides in the provision of means for adjusting the mechanism for operation with either a ten or twelve inch record.

Other objects and advantages will be apparent from the following description when taken in connection with the accompanying drawings.

In the drawings:

Figure 1 is a side elevation of the mechanism, the top board and turn-table being shown in connection therewith.

Figure 2 is a side elevation viewed from the opposite to that of Figure 1.

Figure 3 is an elevation looking toward the back of the tone-arm.

Figure 4 is a top plan view a portion of the turntable being removed.

Figure 5 is a bottom plan view of the top or motor board, showing the portions of the mechanism mounted thereon.

Figure 6 is a vertical sectional view through the device, on the line 6—6 of Figure 4, showing the record gripping means and the spring engaging the flattened portion of the shaft thereof.

Figure 7 is a vertical sectional view through the device on the line 7—7 of Figure 3.

Figure 8 is an enlarged detail view of the tripping pawl means, in connection with the ratchet wheel, of the record turning arms.

Figure 9 is a detail view of the blocks by means of which the record gripping arms are regulated to grip a ten inch or twelve inch record.

Figure 10 is a horizontal sectional view taken on the line 10—10 of Figure 1, just below the lower face of the motor-board.

Figure 11 is a detail view of the gear 72 and the pawl means carried thereby.

Referring particularly to the accompanying drawing, 10 represents the motor-board, or top board of a graphophone, through the center of which extends the center spindle 11, on which the turntable 12 rotates. A swinging tone arm 13 is mounted on one side of the board 10, and has the sound-box 14, and needle holder 15 thereon. Rigidly carried by the tone arm, adjacent its pivot point, is a projecting finger 16, the purpose of which will appear later herein. Mounted in brackets 17, on the lower face of the motor-board 10 in the motor 18, which has the governor disk 19, against which the friction member 20 is arranged to engage to stop or check the speed thereof. Secured to and depending from the lower face of the motor board 10 are the brackets 10', and rotatably supported in these brackets is the shaft 21. Depending from the board 10, and arranged in a line at right angles to the shaft 21, and the brackets 22, and rotatably supported in these brackets is a shaft 23, one end of the shaft being extended at right angles to the body of the shaft and disposed adjacent to and in parallel relation to the shaft 21. Secured on the shaft 21, and rotatable therewith, is a cam disk 24, and engaging on the periphery of the cam is the roller 25 carried by the adjacent end of a lever 26, which is pivotally supported on the depending bracket 27. This roller-carrying end of the lever 26' is disposed beneath the angularly extended end of the shaft 23, in position to lift the said end, when the wider portion of the cam raises the lever, with the result that the shaft 23 will be rocked, to operate other mechanism to which reference will be made later herein. On the adjacent end of the shaft 21 is secured an arm 27, which has its outer end pivotally connected to a link 28, said link having its other end bent laterally and receiving the threaded end of the rod 29 threadedly therethrough. The other end of the rod is slidable through a pair of laterally directed and apertured lugs 30 carried by the adjacent end of a lever 31. The lever 31 extends to the other side of the motor-board 10 where it is rigidly secured to the lower end of a curved member 32, said member extending upwardly through an opening 33, in the board 10.

On the upper face of the board 10, at the side remote from the tone-arm, are the bearing brackets 34, and rotatably supported in these brackets is the shaft 35, said shaft being of a length slightly less than the width of the board. On the shaft, adjacent each end, and inwardly of each of the brackets 34, are collars 36 which serve to pre-longitudinal movement of the shaft in the bearings. Each end of the shaft 35 is flattened, and pivotally secured to each end are the pair of radially extending parallel arms 37. On the shaft 35, adjacent the center thereof, are secured the collars 38, and connected to the collars and to the inner arm of each pair, are coil springs 39. The outer ends of each pair of arms 37 are pivotally connected to a block 40, and disposed transversely through each of these blocks is a short shaft 41, the outer end being provided with a head 42, while the inner end has secured thereto a pair of divergent spring arms 43. The outer ends of the arms 43 are formed with a pair of parallel flanges 44, and are arranged to straddle the edge of a disk record, not shown in Figure 1. Each block has a central opening in its upper forward portion, shown at 46, and secured to the block, and projecting into the opening, is a leaf spring 47, the free end of which bears on the central angular portion of the shaft 41 for the purpose of holding the shaft resiliently against rotation. On the outer end of one of the shafts 41 there is secured a grooved wheel 48, and engaged in the groove of this wheel is the intermediate portion of a chain 49. One end of the chain is secured to one end of a coil spring 50, which spring has its other end secured to the adjacent end of the shaft 35, while the other end of the chain is detachably engaged with the hook 51 of a slidably adjustable plate 52, mounted on the upper face of the motor-board 10, adjacent the shaft 35. The portion of the shaft 41 which passes through this pulley 48 is formed with diametrically opposite radial projections 53 arranged to be engaged by the pivoted spring pressed pawl 54, which is mounted on the body of the pulley.

While this device is adapted for use in connection with the ordinary disk records, it is especially designed for use with records which have the widely spaced groove coils inwardly beyond the innermost groove of the records.

Depending from the tone-arm is a spring pressed plate 87 arranged to engage with first one and then the other of the stop arms 57 and 58, pivotally mounted on the motor-board 10, adjacent the tone arm. Forming a part of one of the collars 36 is a radially extending arm 59, and pivotally connected to the outer end of this arm is a short link 60, which carries a weight 61. The member 32 is pivotally connected with the arm 59.

Disposed vertically through the motor-board 10 is a shaft 62 having on its lower end a disk 63 which has a portion of its edge turned upwardly to form a cam, as shown at 63'. A finger-button 64 is carried by the upper end of the shaft 62, for the purpose of turning the shaft to engage its disk 63' with the adjacent end of the lever 65. This lever 65 is pivotally supported on a bracket 66, on the lower face of the board 10, and has its other end twisted into a horizontal plane, as shown at 65', for a purpose which will appear later herein. A substantially Z-shaped lever 67 is mounted on a vertical pivot 68, on the lower face of the board 10, and has one end disposed upwardly through a slot 69, in the board, and its other end twisted slightly out of the plane of the body thereof, and adjacent one end of a lever 70, which is supported on a bracket 71, on the lower face of the board 10. The upper end is movable over a plate 67'. Secured on the shaft 21, beneath the said end of the lever 70, is a toothed 72 which meshes with the main spring gear of the motor, and has on one of its side faces the laterally projecting pins 73. On the shaft 21 is a radially extending arm 74, the outer end of which rests against the lower face of the lever 70, and has a spring pressed pawl 75 for engagement with the pins 73 of the wheel 72. On the shaft 21, adjacent the toothed wheel 72, are two cams 76 and 77, the former of which has its periphery engaged by the roller 78 carried by the lower end of a projection 79, formed on the link 80. This link 80 is pivotally connected at one end to the vertical link 81, which in turn is pivotally mounted on the lever 82, which is supported on the depending bracket 83. A vertical link 84 is pivotally supported on the other end of the link 80 and has pivotally mounted on its upper end a link 85, which in turn is pivotally connected to the upper end of a vertical link 86 pivotally supported on the first vertical link 81. On the tone-arm is secured a plate 55 having a projection 16, the lower end of which is arranged to be engaged by the projection 85, on the upper end of the vertical link 86, when the tone-arm swings in to the middle of the record.

Pivotally supported on brackets 88, on the lower face of the board 10, are the levers 89 and 90, each having on one end a roller 91, and each roller engaging with the peripheral face of the cam disks 92 and 93, respectively, mounted on the shaft 21. A depending support is mounted on the board 10, adjacent these cams 92 and 93, and through the lower portion of the bracket are disposed the vertical bolts or screws 94 and 95, the former being connected with the lever 89 and the latter to the lever 90, by the springs 96 and 97, respectively. These springs serve to draw the levers downwardly and hold their rollers in firm contact with the peripheries of the cam disks 92 and 93. Pivotally mounted on the board 10, adjacent the shaft 62, is a bent lever 98, the lower end of which is arranged in the path of and adapted to be engaged and moved by a radial arm 99, mounted on the adjacent end of the shaft 21. Pivotally connected to the other end of the lever 98 is a link 100, which engages with the teeth of the ratchet 101, carried by the shaft 62. Another link 102, pivotally carried by the outer end of the lever 103, which is pivotally carried on the board 10, and carries the beforementioned friction member 20, engages with the ratchet wheel 101, and has its pivotal end yieldably connected to the board 10 by the coil spring 104. A stop 98' is provided to limit the movement of the lever 98 in a direction away from the ratchet 101.

On the other end of the shaft 23 is a collar 105, and on this collar is a plate 106 having a plurality of notches 107, arranged in step formation, and in position to engage with the lower portion of an arm 107 extending radially from the shaft. Pivotally supported on a bracket, adjacent the other end of the shaft 35, is a vertical arm 108. Both of these arms 107 and 108 extend upwardly through slots 109 in the board 10 and in position to engage with the inner arms 37, to limit their inward movement toward gripping position with relation to a record. This serves to permit the gripping members 43 to grip a ten inch or a twelve inch record. These arms also serve to hold the arms 37 against inward movement under the influence of the springs 39, until such time as it is desired that the device grip and turn the record.

In the operation of starting the motor, there is provided the face plate 110, on the board 10, which has formed thereon the words "Turn," "One," and "Stop," over which moves the hand 111, carried by the upper end of the shaft 62. A face plate having the words "Open" and "Lock," formed thereon, is placed adjacent the slot 69, for movement of the upper pointed end of the lever 67. Upon movement of this lever to the word "Open," the lever 65 will be permitted to have free pivotal movement on its bracket 66, and the lever 70 permitted to be raised by the arm 74. When, however, the lever 67 is moved to the word "Lock," the cam portion of the disk 63' will rock the lever 67 and lower its other end against the lever 70, so that when the arm 74 attempts to rise, it will be prevented by contact with the lever 70.

The stops having been set, and the pointer or hand 111 placed over the word "Turn," the motor will be started, it being understood that the tone-arm is moved to dispose the needle in the outer-most groove of the record. As the needle enters the wide spiral portion of the groove in the center of the record, the arm is lifted from the record, and moved out toward the edge of the record, by the contact of the members 16 and 85'. The motor continues to run, while at the same time the pawl 75 engages one of the pins 73, of the wheel 72, with the result that the shaft 21 will rotate. As the shaft 21 rotates, the cam 24 will rock the shaft 23, causing the arms 108 to swing inwardly toward each other, thus releasing the arms 37, and permitting the springs 39 to move said arms inwardly and the arms 44—43 to grip the opposite edges of the record. The rotation of the shaft 21 causes the movement of the members 27, 28, 29, and 31, which pulls the member 32 downwardly, rocking the shaft 35, and elevating the arms 37, with the record gripped thereby. As the arms 37 swing upwardly, with the record, pull is exerted on the chain 49, with the result that the shaft 41 is rotated and the record turned to present its other face uppermost. The continued rotation of the shaft 21 causes the retrograde rotation of the shaft 35, with the result that the arms 37 will be lowered and the record placed on the turntable. The cam 24 then rocks the shaft 23 so that the arms 108 are again brought into position to hold the arms 37 in outward spread position, released from the record. The tone-arm having been again swung outwardly, the members 16 and 85' are released, when the stylus will be lowered into the outermost groove of the record. The turntable being in motion the record will be played.

The lever 100 during the above operation, is moved against the ratchet wheel 101 to turn the shaft 62 and bring the hand 111 to the word "One." At the same time, the radial arm 99 swings the arm 98 back and releases the same. When the second side of the record has been played, the hand 111 will have been moved to the word "Stop," and the 103 moved to bring its friction member 20 into engagement with the governor disk, and stop the motor.

What is claimed is:

1. A phonograph including a turntable, means for driving the turntable, and means operated by the driving means for lifting, reversing, and replacing a record.

2. A phonograph including a record driving means, a stylus carrying means, and a record gripping means actuated by the driving means for lifting, reversing, and replacing a record.

3. A phonograph including a turntable and means for driving the turntable, of means driven by the driving means and including record gripping arms, means for holding the arms away from the record while the record is being played, and means for lifting the arms to remove the record from the turntable, reverse the record, and replace the reversed record on the turntable.

4. A phonograph including a turntable and motor driving means, of record manipulating means driven by the driving means and including a pair of record gripping jaws, means holding the jaws away from the record while the record is being played, means for moving the jaws into gripping position when the record has been played, and means for swinging the jaws upwardly and rotating the latter to reverse the record, and subsequently lowering the jaws to replace the reversed record on the turntable.

5. A phonograph including a turntable and motor means for driving the turntable, and means for lifting, reversing and replacing the record including a rock shaft, radial arms carried by and movable with the rock shaft, record gripping means on the arms, means for normally holding the arms away from the record, means actuated by the motor means for releasing the arm holding means.

6. In a phonograph record manipulating mechanism, a rock shaft, radial arms carried by the shaft, record gripping means on the outer ends of the arms, means for holding the arms normally away from the record, resilient means for urging the arms into gripping position, means actuated by the tone-arm of the phonograph for releasing the arm holding means, means for rocking the shaft to lift the record from the turntable of the phonograph, means actuated by the arms for rotating the gripping means to reverse the record, said shaft rocking means rocking the shaft to lower the arms and replace the record on the turntable, and means for moving the tone-arm beyond the edge of the record when the record lifting means begins to move.

7. In a phonograph a record lifting, reversing, and replacing mechanism including a rock shaft, parallel pairs of radial arms pivotally movable with the shaft, and pivotally mounted on the ends of the shaft, a block pivotally carried by the outer ends of the pairs of arms, rotatable shafts carried by the blocks, record gripping jaws carried by and rotatable with the said shafts, means for rocking the first shaft to lift the record from the turntable, means actuated by the rocking of the shaft to turn the last-named shafts to reverse the record, said rocking means, upon further movement thereof, restoring the rock shaft to its original position and moving the arms to replace the record on the turntable.

8. A phonograph mechanism including a rotatable shaft, a motor for driving the shaft, record gripping means on the shaft, means for normally holding the gripping means away from a record, resilient means for urging the gripping means toward the record, and means for adjustable engagement with the gripping means for limiting the movement thereof toward gripping position to accommodate records of different diameters.

In testimony whereof, I affix my signature, in the presence of two witnesses.

GLENN R. KNICK.

Witnesses:
    Mrs. WILLIS COLLINS,
    LESTER COLLINS.